US012752925B2

(12) United States Patent
Bellido López

(10) Patent No.: US 12,752,925 B2
(45) Date of Patent: Oct. 6, 2026

(54) ENERGY RECOVERY SYSTEM AND METHOD FOR AN AIRCRAFT

(71) Applicant: Airbus Operations S.L.U., Getafe (ES)

(72) Inventor: Miguel Bellido López, Getafe (ES)

(73) Assignee: AIRBUS OPERATIONS S.L.U., Getafe (ES)

( * ) Notice: Subject to any disclaimer, the term of this patent is extended or adjusted under 35 U.S.C. 154(b) by 0 days.

(21) Appl. No.: 19/257,605

(22) Filed: Jul. 2, 2025

(65) Prior Publication Data

US 2026/0008552 A1 Jan. 8, 2026

(30) Foreign Application Priority Data

Jul. 3, 2024 (EP) .................................... 24382718

(51) Int. Cl.

| | |
|---|---|
| ***B64D 27/35*** | (2024.01) |
| ***B64C 11/30*** | (2006.01) |
| ***B64D 27/351*** | (2024.01) |
| ***B64D 27/355*** | (2024.01) |
| *B64C 11/06* | (2006.01) |

(52) U.S. Cl.

CPC .......... *B64D 27/351* (2024.01); *B64C 11/305* (2013.01); *B64D 27/355* (2024.01); *B64C 11/06* (2013.01)

(58) Field of Classification Search

CPC .... B64D 27/351; B64D 27/355; B64D 27/31; B64D 2041/005; B64D 27/357; B64C 11/305; B64C 11/06

See application file for complete search history.

(56) References Cited

U.S. PATENT DOCUMENTS

| | | | | |
|---|---|---|---|---|
| 11,891,166 | B2 * | 2/2024 | Gilbert .................... | B64C 27/52 |
| 2019/0225330 | A1 * | 7/2019 | Ramanathan .......... | B64U 10/14 |
| 2021/0039801 | A1 * | 2/2021 | Spierling ................ | F02D 29/06 |
| 2021/0094694 | A1 * | 4/2021 | Seminel ................. | B64D 27/34 |
| 2022/0041299 | A1 * | 2/2022 | Wankewycz ........... | B64D 37/30 |
| 2024/0383610 | A1 * | 11/2024 | Viguier ................. | B64C 23/065 |

FOREIGN PATENT DOCUMENTS

| | | | | |
|---|---|---|---|---|
| EP | 4126672 B1 * | 4/2024 | ........... | B64D 35/024 |

OTHER PUBLICATIONS

European Search Report for corresponding European Patent Application No. 24382718.5 dated Dec. 18, 2024.

* cited by examiner

*Primary Examiner* — Justin M Benedik
(74) *Attorney, Agent, or Firm* — Greer, Burns & Crain, Ltd.

(57) ABSTRACT

An energy recovery system and method for an aircraft having propellers. Specifically, the system and a method recover energy during the descent phase by setting the aircraft engines in propulsive mode or in windmill mode as needed. In windmill mode, the wind drives the propellers to generate electrical energy which may be stored. A pitch angle of the blade of the propellers may be changed.

15 Claims, 4 Drawing Sheets

ENERGY RECOVERY SYSTEM AND METHOD FOR AN AIRCRAFT

CROSS-REFERENCES TO RELATED APPLICATIONS

This application claims the benefit of European Patent Application Number 24382718.5 filed on Jul. 3, 2024, the entire disclosure of which is incorporated herein by way of reference.

FIELD OF THE INVENTION

The present invention relates to energy recovery in an aircraft. Specifically, the present invention relates to a system and a method for recovering energy during the descent phase in a turboprop propelled aircraft by setting the aircraft engines in propulsive mode or in windmill mode as needed.

BACKGROUND OF THE INVENTION

Normally, during a descent phase of a turboprop propelled aircraft, the flaps are deployed in order to increase lift for reducing landing speed and to increase the drag for increasing the descent angle (that is, reducing the landing roll length). During the descent of this type of aircraft, potential energy is wasted.

So far there are no known solutions to try to recover some of the energy wasted during the descent of a turboprop propelled aircraft.

The present invention provides a solution for recovering and storing energy during a descent phase of a turboprop propelled aircraft.

SUMMARY OF THE INVENTION

The present invention provides an energy recovery system for an aircraft according to one or more embodiments described herein, an aircraft according to one or more embodiments described herein, and a method for recovering energy during a descent phase of an aircraft according to one or more embodiments described herein.

In a first inventive aspect, the invention provides an energy recovery system for an aircraft, the energy recovery system comprising:

- a plurality of pods configured to be attached to an aircraft wing, each pod comprising:
  - a propeller,
  - an electrical motor unit connected to the propeller through a shaft,
  - a motor control unit configured to control the electrical motor unit,
  - a main electrical supplying system connected with the motor control unit and being configured to supply electrical energy to the electrical motor unit,
  - a pitch control system configured to modify a pitch angle of the propeller, and
  - a secondary electrical supplying system for electrical energy storage; and
- a power control management system in communication with the plurality of pods and configured to set each propeller through the motor control unit, during a descent phase, in a propulsive mode or in a windmill mode, depending on a load level of the respective secondary electrical supplying system in each pod and a required power to overcome air ram drag of the aircraft;

wherein:

- in the propulsive mode the electrical motor unit is configured to actuate a rotation of the propeller, and
- in the windmill mode:
  - the motor control unit is configured to operate the pitch control system so that the pitch angle of the propeller is modified for the propeller to rotate under the effect of the wind, and
  - the electrical motor unit is configured to generate electrical energy as result of the propeller rotation due to the effect of wind so that the generated electrical energy is stored within the secondary electrical supplying system.

The present invention relates to turboprop aircraft (also called turboprop propelled aircraft). A turboprop is a turbine engine in charge of driving an aircraft propeller. Aircraft are known with at least two propulsion systems, i.e., with two turboprops. For an aircraft, each turboprop is mounted on a pod or nacelle.

The present system comprises a plurality of pods adapted to be attached to a wing of the aircraft. The wing has an upper surface, so-called "extrados" or "suction face", and a lower surface, so-called "intrados" or "pressure face". These pods can be attached to the intrados or the extrados of the aircraft wing.

Each pod comprises a propeller and an electrical motor unit as an electrical power source attached to the propeller through a shaft. The propeller is in charge of converting rotary motion from the electrical motor unit into a swirling slipstream which pushes the propeller forwards or backwards. Specifically, the propeller comprises a rotating power driven hub or rotor to which are attached several radial blades such that the whole assembly rotates about a longitudinal axis along the shaft. The propeller is attached to the electrical motor unit either directly or through a gearbox. The propeller is arranged outside the pod whilst the electrical motor unit is arranged within the pod.

According to the system of the present invention, there is also a motor control unit installed within each pod. This motor control unit is connected to the electrical motor unit for operating the electrical motor unit.

The present system further comprises, for each pod, a main electrical supplying system. This main electrical supplying system is connected to the motor control unit and is in charge of supplying energy to the electrical motor unit. That is, this main electrical supplying system supplies the electrical power that the electrical motor unit needs to rotate the propeller.

The present system also comprises a pitch control system for modifying the pitch angle of the blades of the propeller. This pitch control system is connected to the propeller. The pitch control system allows for changing change the propeller's angle of attack and turn the propellers into windmills.

In addition, in the system of the present invention there is a secondary electrical supplying system installed within each pod. This secondary electrical supplying system stores electrical energy generated by the electrical motor unit as a result of the propeller rotation due to the effect of wind on the aircraft propellers.

The propellers of the present system are configured with at least two operating modes, namely a propulsive mode and a windmill mode.

When a propeller is configured in propulsive mode, the electrical motor unit actuates the rotation of the propeller. That is, in the propulsive mode, the propellers are configured to be actuated by the motor control unit as predefined for the descent phase of the aircraft. In this propulsive mode the electrical motor units will be switched to electrical motor mode providing rotation to the propellers.

By contrast, when a propeller is configured in windmill mode, the pitch control system in each pod is operated to modify the pitch angle of the propeller for the propeller to rotate under the effect of the wind. In addition, when the system is configured in windmill mode, the electrical motor units generate electrical energy due to the propellers rotations because of the effect of the wind, and this electrical energy generated is stored within the secondary electrical supplying system as described above. Thus, in the windmill mode the motor control unit is configured to change the pitch angle of the propellers from a predefined pitch angle for the predefined descent phase of the aircraft. In other words, in the windmill mode the electrical motor units will be switched to generator mode extracting the energy from the propellers rotation and transmitting it to the secondary electrical supplying system.

The present system also comprises a power control management system common to the plurality of pods. This power control management system is in communication with each pod so that during descend phase of the aircraft, the propellers are set through the motor control unit in the propulsive mode or in the windmill mode, as needed. Specifically, the power control management system sets the propellers to propulsive mode or windmill mode depending on the load level of each secondary supplying system and the required power to overcome air ram drag of the aircraft. The loss of thrust in the turboprop engine that is caused by increasing the velocity of the air entering the engine is understood as the air ram drag. In particular, the ram drag is the difference between the gross thrust and the net thrust.

A strategy is established by the power control management system in order to determine which propeller shall be in propulsive mode and which one in windmill mode. In an embodiment, the present system determines the required power to overcome air ram drag during descent phase of the aircraft. This means determining the number of propellers needed to be set in propulsive mode. Thus, a group of propellers is selected to power the aircraft in order to overcome the air ram drag in the propulsive mode. In an embodiment, this selection is carried out based on the load level of the respective secondary electrical supplying system for each pod, so that those secondary electrical supplying systems with the highest load levels are selected. At least one of the rest of the propellers will charge-up the secondary electrical supplying system of the corresponding pod in the windmill mode.

Advantageously, the present system allows for recovery of the energy wasted during a descent phase of an aircraft and also allows the recovered energy to be stored and later used. Thus, the present system mainly provides a fuel saving advantage.

The present system is provided without a free-wheel for the propeller to be able to rotate in both directions. This means that the propeller is able to generate inverse current for charging the secondary electrical supplying system.

The combination of an electrical motor unit, that is able to act as a motor and as a generator, with the pitch control system, allows the present system to change its operating mode. That is, by changing the pitch angle of propellers, the selected propellers will switch from propulsive mode to windmill mode. In an embodiment, the propellers are in propulsive mode by default.

In an embodiment, the power control management system is further configured to actuate the deployment of the aircraft flaps. Normally during the descent of an aircraft, the flaps are deployed in order to increase lift and drag. However, for the present invention, the flaps are partially extended. More particularly, the power control management system is configured to actuate the partial deployment of the flaps. Advantageously, the lift is increased but with low impact on drag so that when the system is configured in windmill mode the drag is increased.

In an embodiment, the main electrical supplying system is a fuel cell system. The fuel cell powers the propellers set in propulsive mode to overcome the air ram drag. In an embodiment, the fuel cell powers the propellers with a power of approximately 50 kW during the descent phase.

In an embodiment, the secondary electrical supplying system is an electrical buffer.

In an embodiment, the electrical buffer comprises a bank of supercapacitors and a DC/DC converter for adapting the voltage to the electrical network characteristics.

In an embodiment, the energy recovery system further comprises a shared storage system, wherein the shared storage system is connected with the motor control unit of each pod and is configured to store at least part of the electrical energy generated on the windmill mode.

Advantageously, this recovered energy stored in the shared storage system can be used for any of the aircraft pods or for any other system on board the aircraft without the need to waste fuel or have to generate electrical power.

In an embodiment, at least one diode is arranged on the motor control unit or on the main electrical supplying system or in a connection between the motor control unit and the main electrical supplying system, said at least one diode being configured to prevent the electrical energy generated in windmill mode from reaching the main electrical supplying system.

A diode is installed between the motor control unit and the main electrical supplying system in order to avoid potential negative current flowing into the main electrical supplying system when the propeller is in windmill mode. Advantageously, this diode protects the main electrical supplying system against inverse current.

In a second inventive aspect, the invention provides an aircraft comprising an energy recovery system according to any one of the embodiments of the first inventive aspect.

In an embodiment, the aircraft is a turboprop propelled aircraft.

In an embodiment, the plurality of pods of the energy recovery system is distributed along two wings of the aircraft and attached respectively to the corresponding wing.

In a third inventive aspect, the invention provides a method for recovering energy during a descent phase of an aircraft, the aircraft comprising a plurality of pods and each pod comprising a propeller, an electrical motor unit and a secondary electrical supplying system, the method comprising:

a) determining a minimum number of propellers needed to provide a required power to overcome air ram drag in the descent phase of the aircraft,
b) setting as many propellers as provided in step a) in propulsive mode, wherein said propellers are those with a highest load level of their respective secondary electrical supplying system,
c) setting at least one of the remaining propellers in windmill mode by modifying a pitch angle of the propeller for the propeller to rotate under the effect of the wind, d) generating electrical energy by the electrical motor unit through the rotation of the at least one propeller set in windmill mode, and e) recharging the corresponding secondary electrical supplying system with the electrical energy generated in step d).

The method of the present invention has the purpose of recovering and storing energy that may originate during the descent phase of an aircraft, specifically, a turboprop propelled aircraft.

The plurality of pods of the aircraft can be attached to the intrados or the extrados of the aircraft wings.

Before step a), the method comprises determining the power required to overcome air ram drag in the descent phase of the aircraft. In another embodiment, before step a) the method comprises providing a predefined power required to overcome air ram drag during the descent phase of the aircraft.

Once such required power is known, the present method determines in step a) how many propellers would be needed to provide such power to overcome air ram drag in the descent phase of the aircraft.

Next, these minimum number of propellers needed for providing the mentioned power are set in a propulsive mode in step b). This means that the propellers set in propulsive mode are rotated, for example through the operation of an electrical motor unit.

For the propulsive mode, the minimum number of propellers are selected according to the load level of the respective secondary electrical supplying system for each propeller. That is, it is selected the propellers whose respective secondary electrical supplying system has the highest load level.

Once the minimum number of propellers needed in propulsive mode are selected, then the method comprises in step c) setting at least one of the remaining propellers in a windmill mode. Said at least one of the remaining propellers will be linked to a secondary electrical supplying system whose load level is lower than that of the propellers set in propulsion mode. In an embodiment, the propeller whose respective secondary electrical supplying system has the lowest load level is chosen from among all the remaining propellers to be set in windmill mode.

In an embodiment, a plurality of the propellers that are not set in propulsive mode are set in windmill mode. In an embodiment, all the propellers that are not set in propulsive mode are set in windmill mode.

To set in a windmill mode leads to modifying the pitch angle of the propeller for the propeller to rotate under the effect of the wind. This means that the propeller set in windmill mode starts rotating under the effect of the wind and this rotation is converted into electrical energy by an electrical motor unit connected to the selected propeller. Therefore, in the windmill mode the pitch angle of the propeller is changed from a predefined pitch angle for the predefined descent phase of the aircraft. In this case, the electrical motor unit is switched to generator mode for extracting the energy from the propeller rotation.

By last, the method comprises in step e) storing the electrical energy generated in step d) in the secondary electrical supplying system corresponding to the propeller set in windmill mode. Thus, the secondary electrical supplying system with low load level is recharged during the descent phase of the aircraft through the at least one propeller set in windmill mode.

Advantageously, the present method allows recovering energy during the descent phase of an aircraft and storing such recovered energy to be later used. The method also provides a fuel saving advantage due to the availability of electrical energy to be recovered.

Therefore, the present method splits the set of propellers so that a selected group of propellers will power the aircraft in order to overcome the air ram drag whilst one or more of the rest of propellers will charge-up the secondary electrical supplying system of the corresponding pod.

In an embodiment, the method further comprises the step of partially extending flaps of the aircraft. This provides the advantage of increasing the lift but with low impact on drag so that when the at least one propeller is set in windmill mode the drag is increased.

In an embodiment, step b) comprises rotating the propellers in propulsive mode by the electrical motor unit comprised in the corresponding pod. Specifically, the electrical motor unit is connected to the corresponding propeller through a shaft. The propellers set in propulsive mode are in charge of converting the rotary motion from the corresponding electrical motor units into a swirling slipstream which pushes the propellers forward or backwards. Specifically, the propeller comprises a rotating power-driven hub or rotor to which are attached several radial blades such that the whole assembly rotates about a longitudinal axis along the shaft. The propeller is attached to the electrical motor unit either directly or through a gearbox. The propeller is arranged outside the pod whilst the electrical motor unit is arranged within the pod.

In an embodiment, the electrical motor unit is energy supplied by a main electrical supplying system comprised in the corresponding pod. The main electrical supplying system supplies the electrical power the electrical motor unit needs to rotate the propeller.

In an embodiment, the pitch angle, of each propeller to be set in windmill mode in step c), is modified through a pitch control system comprised in the corresponding pod. In particular, the pitch control system changes the pitch angle of the propellers blades so that the angle of attack of the propellers is turned into windmills.

In an embodiment, the pitch control system is operated by the power control management system. This power control management system is connected with the pitch control system to control the operation of the pitch control system if the pitch angle needs to be modified to change from propulsive mode to windmill mode.

In an embodiment, the motor control unit controls the operation of the electrical motor unit as an actuator for the rotation of the propeller in propulsive mode and as an electrical power generator in windmill mode.

In an embodiment, steps a) to c) are controlled by a power control management system comprised in the aircraft. This power control management system is in data communication with each pod so that during the descent phase of the aircraft, the propellers are set through in the propulsive mode or windmill mode, as needed. Specifically, the power control management system sets the propellers to propulsive mode or windmill mode depending on the load level of each secondary electrical supplying system and the required power necessary for other flight phases of the aircraft.

The power control management system establishes a strategy to determine which propeller shall be in propulsive mode and which one in windmill mode.

According to the invention, the power control management system detects which pods have secondary electrical supplying systems with less energy, that is, with less load level. Then, the power control management system establishes the minimum number of pods needed to be in propulsive mode to provide the required power to overcome air ram drag.

In an embodiment, the power control management system changes the configuration of a propeller from windmill mode to propulsive mode or vice versa as needed. In an embodiment, if the power control management system detects that a propeller in windmill mode for which the respective secondary electrical supplying system has been fully recharged, this propeller is switched to the propulsive mode, and, among the propellers in the propulsive mode, the one, for which the respective secondary electrical supplying system is with the lowest load level, is switched to the windmill mode.

In an embodiment, the method further comprises storing at least part of the electrical energy generated on the windmill mode in a shared storage system comprised in the aircraft.

In an embodiment, the method is for recovering energy during a descent phase of an aircraft according to any embodiment of the second inventive aspect.

In an embodiment, the method is carried out through an energy recovery system according to any embodiment of the first inventive aspect.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Figure 2:
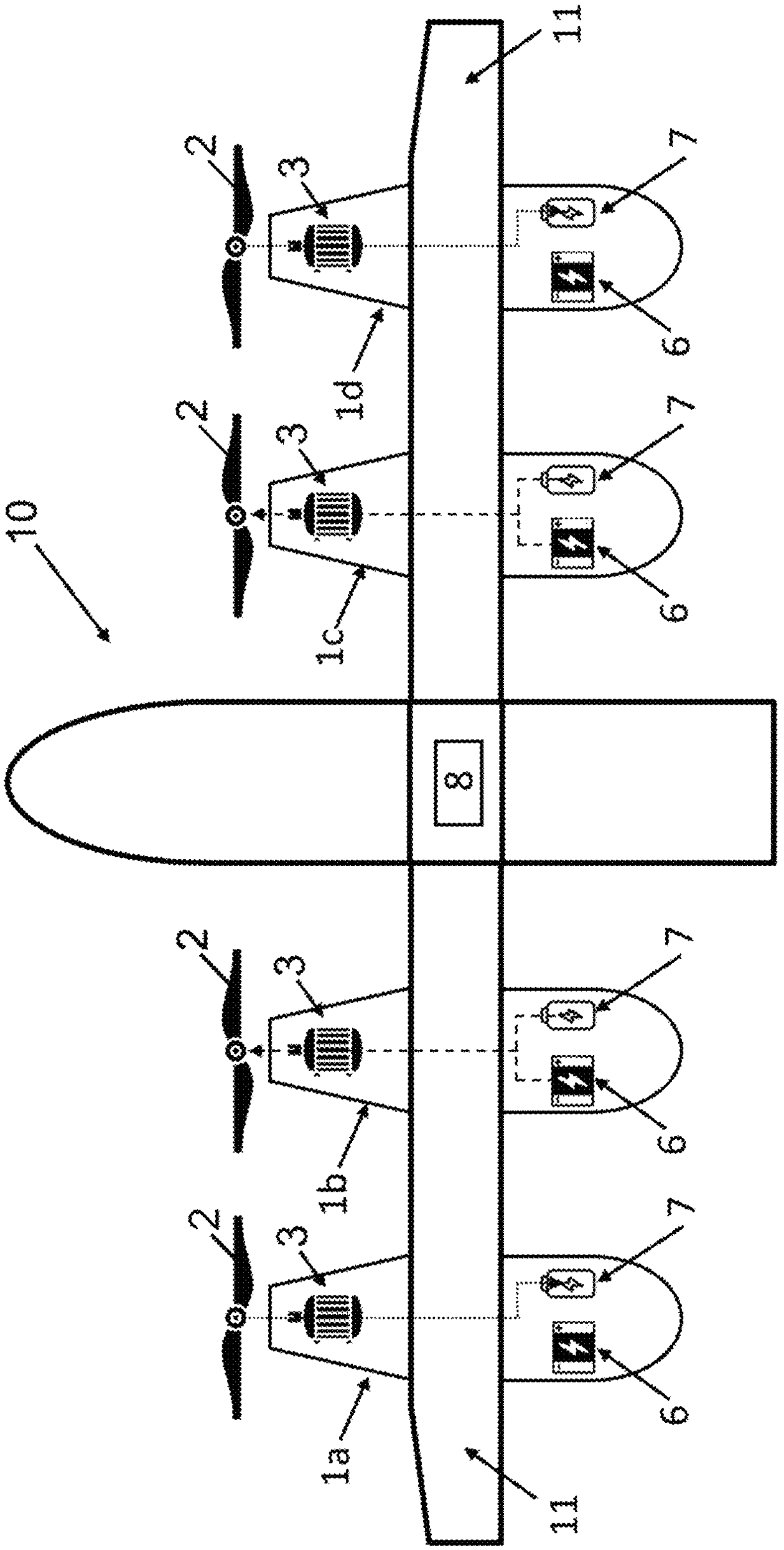
FIG. 2 shows a schematic view of an aircraft comprising an energy recovery system according to an embodiment of the present invention.
Figure 3:
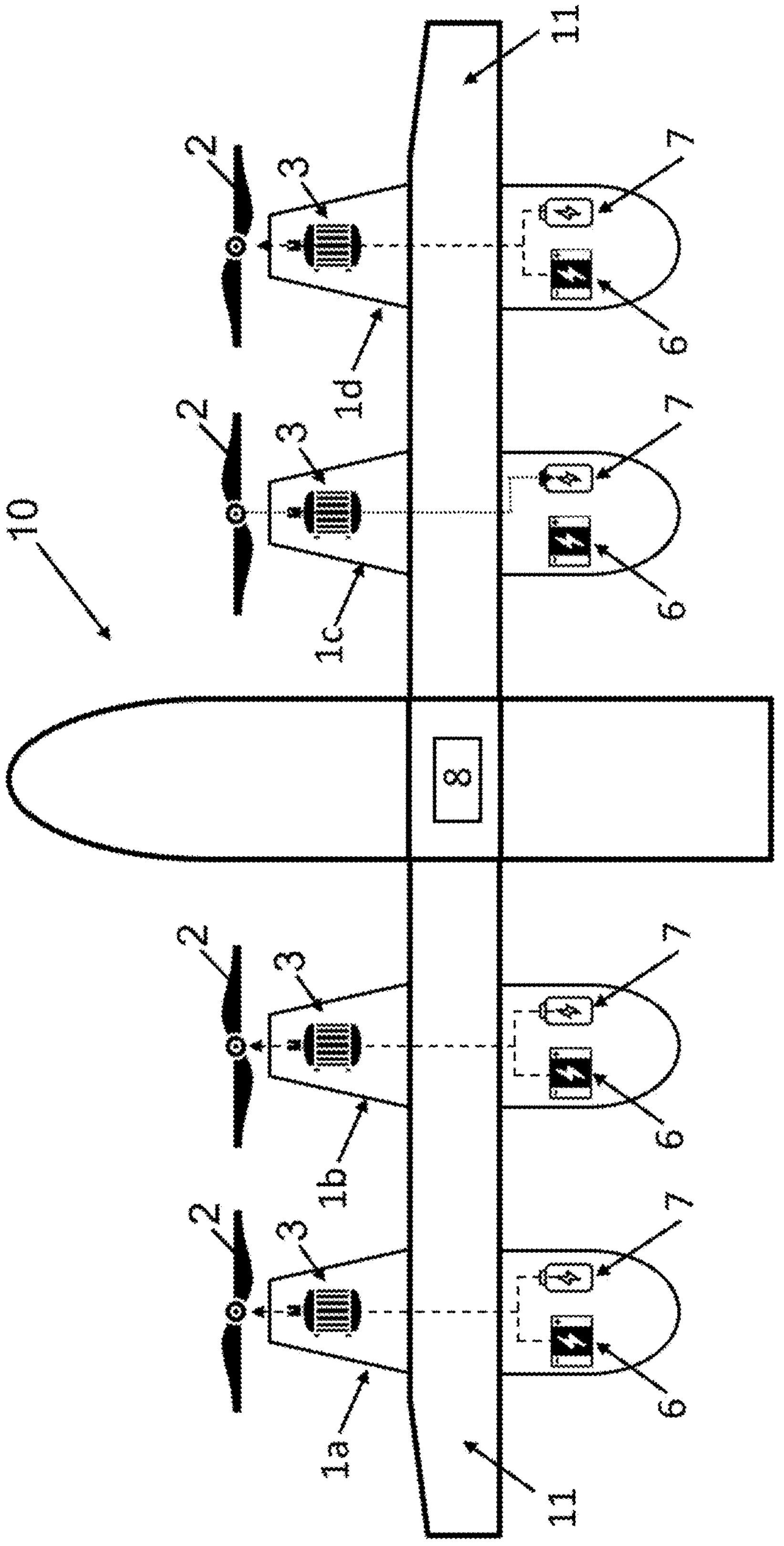
FIG. 3 shows a schematic view of an aircraft comprising an energy recovery system according to an embodiment of the present invention.
Figure 4:
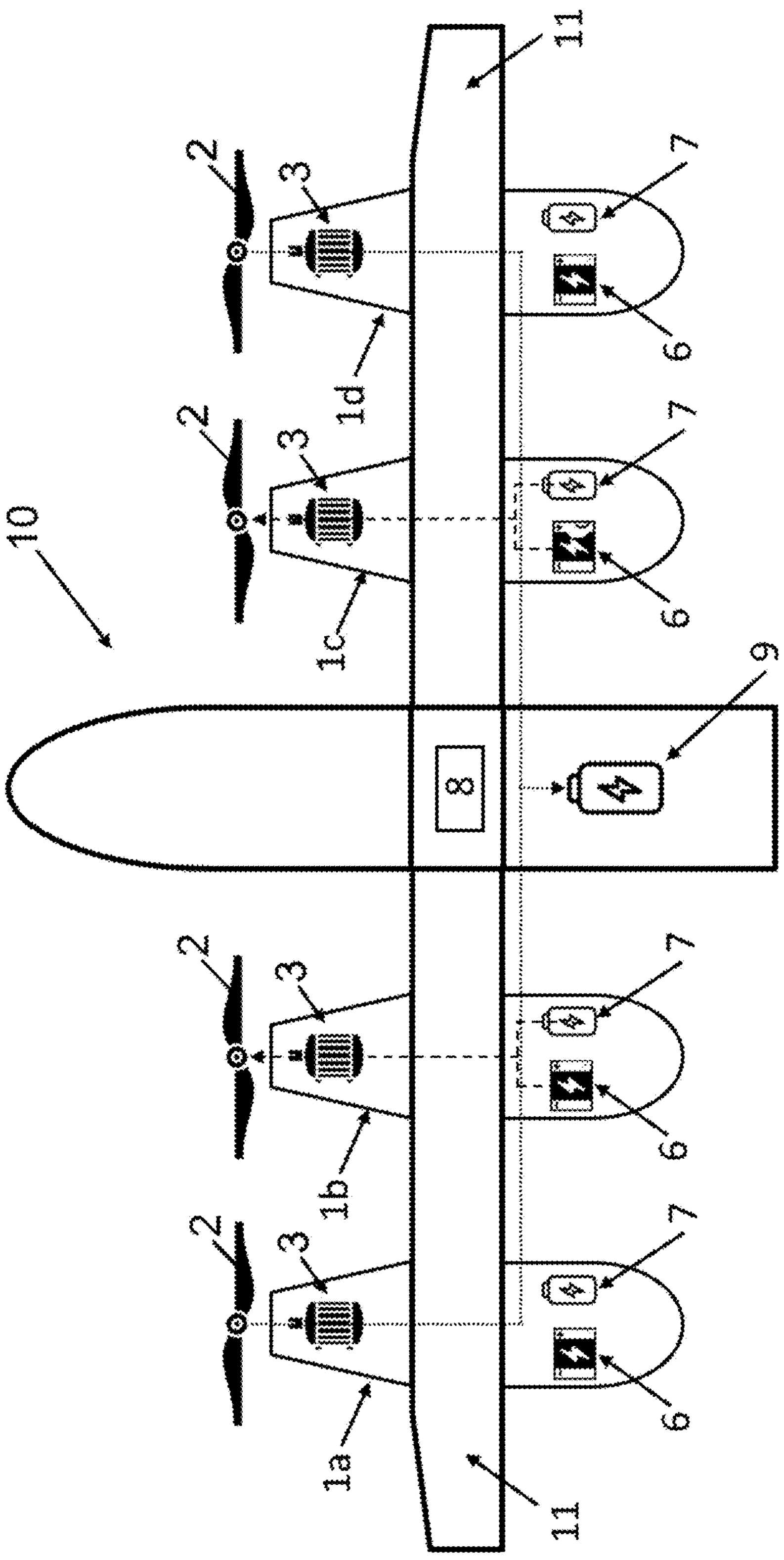
FIG. 4 shows a schematic view of an aircraft comprising an energy recovery system according to an embodiment of the present invention.

The present invention provides an energy recovery system for an aircraft (10). The energy recovery system comprises a plurality of pods (1, 1*a*, 1*b*, 1*c*, 1*d*) attached to the wings (11) of the aircraft (10), for example attached to the intrados of the wings (11) of the aircraft (10) as shown in any of FIGS. 2 to 4. Specifically, these FIGS. 2 to 4 show a turboprop propelled aircraft (10) comprising four pods (1, 1*a*, 1*b*, 1*c*, 1*d*) distributed between the two wings (11).

Figure 1:
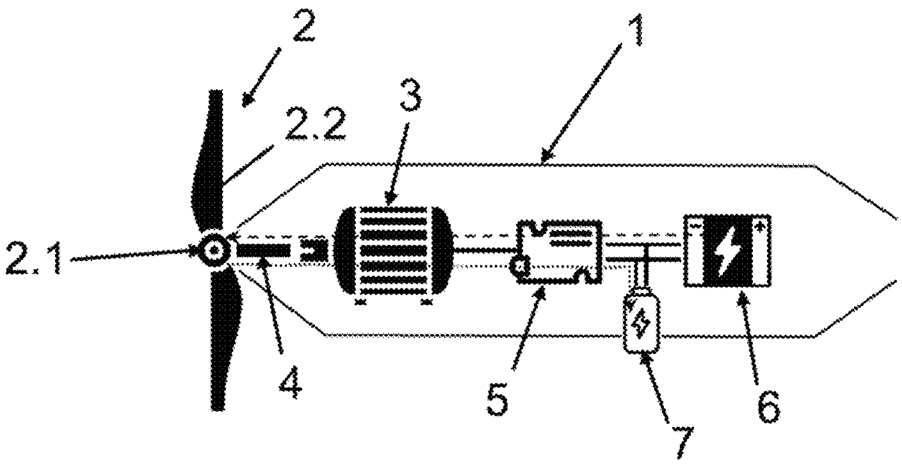
FIG. 1 shows a schematic view of an energy recovery system according to an embodiment of the present invention.

FIG. 1 shows a schematic view of one of these pods (1, 1*a*, 1*b*, 1*c*, 1*d*). The pod (1, 1*a*, 1*b*, 1*c*, 1*d*) has a propeller (2) comprising a rotating power-driven hub or rotor (2.1) to which are attached several radial blades (2.2) such that the whole assembly rotates about a longitudinal axis.

The pod (1, 1*a*, 1*b*, 1*c*, 1*d*) further comprises an electrical motor unit (3) connected to the propeller (2) through a shaft (4) along the longitudinal axis already mentioned above. Specifically, the propeller (2) is attached to the electrical motor unit (3) either directly or through a gearbox. As can be seen in FIG. 1, the propeller (2) is arranged outside the pod (1, 1*a*, 1*b*, 1*c*, 1*d*) whilst the electrical motor unit (3) is arranged within the pod (1, 1*a*, 1*b*, 1*c*, 1*d*).

The pod (1, 1*a*, 1*b*, 1*c*, 1*d*) further comprises inside a motor control unit (5) for controlling the operation of the electrical motor unit (3), among other components.

The pod (1, 1*a*, 1*b*, 1*c*, 1*d*) also comprises a main electrical supplying system (6) connected to the motor control unit (5) and configured to supply the electrical energy the electrical motor unit (3) needs for its operation. In the embodiment shown in FIG. 1, the main electrical supplying system (6) is a fuel cell system.

The energy recovery system also provides a pitch control system (not shown) within the pod (1, 1*a*, 1*b*, 1*c*, 1*d*). The pitch control system is connected with the propeller (2) and is in charge of modifying the pitch angle of the propeller (2). The pitch control system is operated if the pitch angle needs to be modified.

In addition, there is a secondary electrical supplying system (7) arranged within the pod (1, 1*a*, 1*b*, 1*c*, 1*d*). This secondary electrical supplying system (7) is configured to store electrical energy generated by the electrical motor unit (3) as a result of the propeller (2) rotation due to the effect of wind on the propeller (2). In the embodiment shown in FIG. 1, the secondary electrical supplying system (7) is an electrical buffer.

The propellers (2) of the energy recovery system are configured with at least two operating modes which are a propulsive mode and a windmill mode. For determining the operating mode for each propeller (2), the energy recovery system comprises a power control management system (8) as shown in FIGS. 2 to 4. The power control management system (8) is in communication with all the pods (1, 1*a*, 1*b*, 1*c*, 1*d*) of the aircraft (10) for setting each propeller (2) through the motor control unit (5), during descent phase of the aircraft (10), in any of the operating modes (propulsive mode or windmill mode). The setting of each propeller (2) to one mode or the other is based on the load level of the respective secondary electrical supplying system (7) in each pod (1, 1*a*, 1*b*, 1*c*, 1*d*) and the power to be required to overcome air ram drag of the aircraft during the descent phase.

When one pod (1, 1*a*, 1*b*, 1*c*, 1*d*) is set in propulsive mode, the electrical motor unit (3) is switched to electrical motor mode for actuating the rotation of the respective propeller (2).

When one pod (1, 1*a*, 1*b, c*, 1*d*) is set in windmill mode, the pitch control system is operated by the power control management system (8) to modify the pitch angle of the propeller (2) for the propeller (2) to rotate under the effect of the wind. In addition, for the windmill mode the electrical motor unit (3) is set as a generator and generates electrical energy due to the propeller (2) rotations because of the effect of the wind. Also, the electrical energy generated by the electrical motor unit (3) is stored within the secondary electrical supplying system (7). The motor control unit (5) changes the pitch angle of the propeller (2) from a predefined pitch angle for the predefined descent phase of the aircraft (10).

FIG. 1 further shows the operation in the pod (1, 1*a*, 1*b*, 1*c*, 1*d*) for both operating modes. The propulsive mode is represented with dashes as the main electrical supplying system (6) powering the electrical motor unit (3) for the rotation of the propeller (2). By contrast, the windmill mode is represented in dots as the propeller (2) charging up the secondary electrical supplying system (7).

In an embodiment, the energy recovery system further comprises a shared storage system (9) as shown in FIG. 4. This shared storage system (9) is connected with the motor control unit (5) of each pod (1, 1*a*, 1*b*, 1*c*, 1*d*) and is used to store part of the electrical energy generated by the electrical motor unit (3) corresponding to the pods (1, 1*a*, 1*b*, 1*c*, 1*d*) set in windmill mode.

In an embodiment, such as the one shown in FIG. 1, the motor control unit (5) of the energy recovery system comprises two diodes. In another embodiment, the diodes are located on the main electrical supplying system (6) or in the connection between the motor control unit (5) and the main electrical supplying system (6).

The present invention further provides a method for recovering energy during descent phase of an aircraft (10) comprising a plurality of pods (1, 1*a*, 1*b*, lc, 1*d*), wherein each pod (1, 1*a*, 1*b*, 1*c*, 1*d*) comprises a propeller (2), an electrical motor unit (3) and a secondary electrical supplying system (7). This method is described below according to the different scenarios shown by FIGS. 2 to 4.

The method firstly determines for the descent phase of the aircraft (10) the required power for overcoming air ram drag. Alternatively, the required power for overcoming the air ram drag is provided as a predefined data.

In an embodiment, the method further comprises partially extending the flaps of the aircraft (10).

The method comprises in step a) determining by the power control management system (8) the minimum number of propellers (2) needed to provide the required power to overcome the air ram drag in the descent phase.

For selecting which propellers (2) are going to be set for providing the required power to overcome the air ram drag, the power control management system (8) checks the load level of each of the secondary electrical supplying systems (7) and selects those whose load level is higher, as many as the minimum number of propellers (2) determined in step a). The selected propellers (2) are set in propulsive mode according to step b). In addition, step b) comprises actuating the rotation of the selected propellers to be set in propulsive mode by the electrical motor unit (3). Specifically, it is the main electrical supplying system (6) which is in charge of supplying power to the operation of the electrical motor unit (3).

For example, in the case that the power control management system (8) determines that two propellers (2) are necessary for overcoming the air ram drag in the descent phase, FIGS. 2 and 4 show different strategies.

In the embodiments of FIGS. 2 and 4, the secondary electrical supplying system (7) of the first pod (1*a*) has 25% of load, the secondary electrical supplying system (7) of the second pod (1*b*) has 98% of load, the secondary electrical supplying system (7) of the third pod (1*c*) has 89% of load, and the secondary electrical supplying system (7) of the forth pod (1*d*) has 36% of load. In this embodiment, those secondary electrical supplying systems (7) with the highest load levels, that is, the secondary electrical supplying systems (7) of the second pod (1*b*) and third pod (1*c*), are those for which the corresponding propellers (2) are to be set in the propulsive mode.

In another example, in case that the power control management system (8) determines that it is necessary three propellers (2) for overcoming the air ram drag in the descent phase, FIG. 3 shows a strategy accordingly.

In the embodiment of FIG. 3, the secondary electrical supplying system (7) of the first pod (1*a*) has 95% of load, the secondary electrical supplying system (7) of the second pod (1*b*) has 87% of load, the secondary electrical supplying system (7) of the third pod (1*c*) has 62% of load, and the secondary electrical supplying system (7) of the forth pod (1*d*) has 95% of load. In this embodiment, those secondary electrical supplying systems (7) with the highest load levels, that is, the secondary electrical supplying systems (7) of the first pod (1*a*), second pod (1*b*) and forth pod (1*d*), are those for which the corresponding propellers (2) are to be set in the propulsive mode.

The method further comprises in step c) setting at least one propeller (2) of the remaining propellers (2) in windmill mode. The windmill mode leads the pitch control system to modify the pitch angle of at least one propeller (2) of the remaining propellers (2) for the propeller (2) to rotate under the effect of the wind on such propeller (2). It is the power control management system (8) which actuates the pitch control system for setting in windmill mode the corresponding propeller (2).

That is, once the minimum number of propellers (2) needed in propulsive mode are selected, then the method comprises in step c) setting at least one of the remaining propellers in windmill mode. One of the remaining propellers will be linked to a secondary electrical supplying system whose load level is lower than that of the propellers set in propulsion mode. In an embodiment, the propeller whose respective secondary electrical supplying system has the lowest load level is chosen from among all the remaining propellers to be set in windmill mode. In an embodiment, a plurality of the remaining propellers (2) are set in windmill mode. In an embodiment, all the remaining propellers (2) are set in windmill mode.

According to FIGS. 2 and 4, the remaining propellers (2) whose corresponding secondary electrical supplying systems (7) have a load level of 25% and 36% are set in windmill mode. That is, the first pod (1*a*) and the fourth pod (1*d*) are set in windmill mode in both embodiments of FIGS. 2 and 4. According to FIG. 3, the remaining propeller (2) whose corresponding secondary electrical supplying system (7) has a load level of 65% is set in windmill mode. That is, the third pod (1*c*) is set in windmill mode.

Depending on which operating mode is determined for each propeller (2), its respective electrical motor unit (3) is configured as an actuator for the rotation of the propeller (2) for the propulsive mode or as an electrical power generator for the windmill mode.

Once one or more of the remaining propellers (2) are set in windmill mode, the corresponding electrical motor units (3) start according to step d) to generate electrical energy through the rotation of the propellers (2) set in windmill mode, specifically those with a lower load level as specified in particular for examples in FIGS. 2 to 4.

Furthermore, such electrical energy that is generated by the electrical motor units (3) is then transferred to the corresponding secondary electrical supplying systems (7), specifically to those which have lowest load levels for recharging the secondary electrical supplying system (7).

To set in a windmill mode leads to modifying the pitch angle of the propeller for the propeller to rotate under the effect of the wind. This means that the propeller set in windmill mode starts rotating under the effect of the wind and this rotation is converted into electrical energy by an electrical motor unit connected to the selected propeller. Therefore, in the windmill mode the pitch angle of the propeller is changed from a predefined pitch angle for the predefined descent phase of the aircraft. In this case, the electrical motor unit is switched to generator mode for extracting the energy from the propeller rotation.

By last, the method comprises in step e) storing the electrical energy generated in step d) in the secondary electrical supplying system corresponding to the propeller set in windmill mode. Thus, the secondary electrical supplying system with low load level is recharged during the descent phase of the aircraft through the at least one propeller set in windmill mode.

Steps a) to c) are controlled by the power control management system (8) of the energy recovery system provided in the aircraft (10).

In an embodiment, the method further comprises storing part of the electrical energy generated by the electrical motor unit (3) in windmill mode in the shared storage system (9) as shown in FIG. 4. In this example, the load level of the secondary electrical supplying systems (7) is the same as in the example of FIG. 3.

In an embodiment, the power control management system (8) changes the configuration of a propeller (2) from windmill mode to propulsive mode or vice versa as needed during descent phase of the aircraft (10). For example, if the power control management system (8) detects that a propeller (2) set in windmill mode for which respective secondary electrical supplying system (7) has been fully recharged, this propeller (2) is switched from windmill mode to the propulsive mode. In addition, among the remaining propellers (2) in the propulsive mode, the one for which respective secondary electrical supplying system (7) is with the lowest load level, this propeller (2) is switched from propulsive mode to windmill mode.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An energy recovery system for an aircraft, the energy recovery system comprising:

- a plurality of pods configured to be attached to an aircraft wing, each pod comprising:
  - a propeller,
  - an electrical motor unit connected to the propeller through a shaft,
  - a motor control unit configured to control the electrical motor unit,
  - a main electrical supplying system connected with the motor control unit and configured to supply electrical energy to the electrical motor unit,
  - a pitch control system configured to modify a pitch angle of the propeller, and
  - a secondary electrical supplying system for electrical energy storage; and
- a power control management system in communication with the plurality of pods and configured to set each propeller through the motor control unit, during a descent phase, in a propulsive mode or in a windmill mode, depending on a load level of the respective secondary electrical supplying system in each pod and a required power to overcome air ram drag of the aircraft, the power control management system comprising a controller, wherein the controller is implemented to determine a minimum number of propellers needed to provide the required power to overcome air ram drag in a descent phase of the aircraft, set the minimum number of propellers in the propulsive mode, wherein said minimum number of propellers are those with a highest load level of the respective secondary electrical supplying system, set at least one remaining propeller in windmill mode by modifying a pitch angle of the remaining propeller for the remaining propeller to rotate based on wind, control generation of electrical energy by the electrical motor unit through a rotation of the at least one remaining propeller set in windmill mode, and control recharge of the respective secondary electrical supplying system with the electrical energy resulting from the rotation of the at least one remaining propeller set in windmill mode, wherein in the propulsive mode, the electrical motor unit is configured to actuate a rotation of the propeller, and wherein the windmill mode, the motor control unit is configured to operate the pitch control system so that the pitch angle of the propeller is modified for the propeller to rotate from wind, and the electrical motor unit is configured to generate electrical energy as result of the propeller rotation due to wind so that the generated electrical energy is stored within the secondary electrical supplying system.

2. The energy recovery system according to claim 1, wherein the main electrical supplying system is a fuel cell system.

3. The energy recovery system according to claim 1, wherein the secondary electrical supplying system is an electrical buffer.

4. The energy recovery system according to claim 1, further comprising:

a shared storage system, wherein the shared storage system is connected with the motor control unit of each pod and is configured to store at least part of the electrical energy generated on the windmill mode.

5. The energy recovery system according to claim 1, wherein at least one diode is arranged on the motor control unit or on the main electrical supplying system or in a connection between the motor control unit and the main electrical supplying system, said at least one diode being configured to prevent the electrical energy generated in windmill mode from reaching the main electrical supplying system.

6. An aircraft comprising:

the energy recovery system according to claim 1.

7. A method for recovering energy during a descent phase of an aircraft, the aircraft comprising a plurality of pods and each pod comprising a propeller, an electrical motor unit and a secondary electrical supplying system, the method comprising:

a) determining a minimum number of propellers needed to provide a required power to overcome air ram drag in a descent phase of the aircraft;

b) setting the minimum number of propellers as determined in step a) in propulsive mode, wherein said minimum number of propellers are those with a highest load level of the respective secondary electrical supplying system;

c) setting at least one remaining propeller in windmill mode by modifying a pitch angle of the at least one remaining propeller for the at least one remaining propeller to rotate based on wind;

d) generating electrical energy by the electrical motor unit through a rotation of the at least one remaining propeller set in windmill mode; and e) recharging the respective secondary electrical supplying system with the electrical energy generated in step d).

8. The method according to claim 7, further comprising: partially extending flaps of the aircraft.

9. The method according to claim 7, wherein step b) comprises actuating a rotation of propellers in propulsive mode through the electrical motor unit of the respective pod.

10. The method according to claim 9, wherein the electrical motor unit is energy supplied by a main electrical supplying system of the respective pod.

11. The method according to claim 7, wherein the pitch angle of each propeller to be set in windmill mode in step c) is modified through a pitch control system of the respective pod.

12. The method according to claim 11, wherein the pitch control system is operated by a power control management system.

13. The method according to claim 12, wherein the motor control unit controls an operation of the electrical motor unit as an actuator for a rotation of the propeller in propulsive mode and as an electrical power generator in windmill mode.

14. The method according to claim 7, wherein steps a) to c) are controlled by a power control management system of the aircraft.

15. The method according to claim 7, further comprising: storing at least part of the electrical energy generated on the windmill mode in a shared storage system of the aircraft.

* * * * *